United States Patent
Mackenzie et al.

(10) Patent No.: US 12,544,611 B2
(45) Date of Patent: Feb. 10, 2026

(54) METHOD AND APPARATUS FOR TESTING A TUNNEL FIRE SUPPRESSION SYSTEM

(71) Applicant: Paradigm Flow Services Limited, Aberdeen (GB)

(72) Inventors: Hugh Mackenzie, Aberdeenshire (GB); Ashley Thomson, Aberdeenshire (GB); Angus Macaulay, Aberdeenshire (GB)

(73) Assignee: Paradigm Flow Services Limited, Aberdeen (GB)

( * ) Notice: Subject to any disclaimer, the term of this patent is extended or adjusted under 35 U.S.C. 154(b) by 248 days.

(21) Appl. No.: 18/248,274

(22) PCT Filed: Oct. 15, 2021

(86) PCT No.: PCT/GB2021/052669
§ 371 (c)(1),
(2) Date: Apr. 7, 2023

(87) PCT Pub. No.: WO2022/079441
PCT Pub. Date: Apr. 21, 2022

(65) Prior Publication Data
US 2023/0381565 A1    Nov. 30, 2023

(30) Foreign Application Priority Data

Oct. 16, 2020  (GB) .................................... 2016462

(51) Int. Cl.
*A62C 37/50* (2006.01)
*A62C 3/02* (2006.01)
*A62C 35/68* (2006.01)

(52) U.S. Cl.
CPC ............ *A62C 37/50* (2013.01); *A62C 3/0221* (2013.01); *A62C 35/68* (2013.01)

(58) Field of Classification Search
CPC ....... A62C 3/0221; A62C 35/62; A62C 35/68; A62C 37/50
See application file for complete search history.

(56) References Cited

U.S. PATENT DOCUMENTS 5,680,329 A * 10/1997 Lloyd ................... A62C 35/60
                                                                    417/63
7,383,892 B2 * 6/2008 Jackson ................. A62C 35/00
                                                                    239/69

(Continued)

FOREIGN PATENT DOCUMENTS

DE    102010050505 A1 *  5/2012 ............. A62C 37/50
GB        2513010 A      10/2014

(Continued)

OTHER PUBLICATIONS

International Search Report PCT/ISA/210 for International Application No. PCT/GB2021/052669 on Jan. 24, 2022.

(Continued)

*Primary Examiner* — Alex M Valvis
(74) *Attorney, Agent, or Firm* — Harness, Dickey & Pierce, P.L.C.

(57) ABSTRACT

A method for testing a tunnel fire suppression system in the form of a water deluge system having a wet side and a dry side separated by a valve, includes the step of providing a nozzle arrangement comprising a plurality of nozzles, with each nozzle disposed in or coupled to an outlet of the water deluge system. The nozzle arrangement comprises, is coupled to or operatively associated with a sensor arrangement configured to measure the pressure of air at each of the plurality of outlets of the water deluge system and output one or more output signals indicative of the pressure of the air at the one or more outlets. The method includes providing a supply of pressurised air through the water deluge system using a blower coupled to the water deluge system. The (Continued)

method further includes measuring the pressure of the air at the one or more outlets of the water deluge system and outputting an output signal indicative of the pressure of the air at the one or more outlets, and conveying the output signal to a processing system configured to determine from said one or more output signals the flow rate of the air supply at the one or more outlets.

22 Claims, 9 Drawing Sheets

(56) References Cited

U.S. PATENT DOCUMENTS

| | | | | |
|---|---|---|---|---|
| 10,451,457 | B2* | 10/2019 | Mackenzie | G01F 1/053 |
| 2011/0139264 | A1* | 6/2011 | Kuwatch | A62C 35/68 |
| | | | | 137/511 |
| 2014/0338927 | A1* | 11/2014 | Palle | A62C 35/68 |
| | | | | 169/16 |
| 2019/0224513 | A1* | 7/2019 | Goyette | A62C 35/62 |

FOREIGN PATENT DOCUMENTS

| | | |
|---|---|---|
| GB | 2597438 A | 2/2022 |
| JP | 2011188976 A | 9/2011 |
| WO | WO-2021250389 A1 | 12/2021 |

OTHER PUBLICATIONS

Written Opinion PCT/ISA/237 for International Application No. PCT/GB2021/052669 on Jan. 24, 2022.
Great Britian Search Report for GB2016462.0 on Mar. 31, 2021.
Great Britian Search Report for GB2016462.0 on Feb. 8, 2023.
International Preliminary Report on Patentability for PCT/GB2021/052669 dated Apr. 27, 2023.
Office Action dated Oct. 28, 2025 issued in corresponding Japanese Patent Application No. 2023-522765.

* cited by examiner

METHOD AND APPARATUS FOR TESTING A TUNNEL FIRE SUPPRESSION SYSTEM

CROSS-REFERENCE TO RELATED APPLICATIONS

This application is a national phase under 35 U.S.C. § 371 of PCT International Application No. PCT/GB2021/052669 which has an International filing date of Oct. 15, 2021, which claims priority to UK Application No. 2016462.0, filed Oct. 16, 2020, the entire contents of each of which are hereby incorporated by reference.

FIELD

This relates to a method and apparatus for testing a tunnel fire suppression system, in particular but not exclusively a water deluge system.

BACKGROUND

Construction tunnels have been used for centuries and form an integral part of many transport infrastructure systems. For example, tunnels are used extensively in rail transport infrastructure to carry rail lines and in road transport infrastructure to carry the roadway. Indeed, a substantial portion of many modern rail and motorway systems are carried by tunnels.

It has long been recognised that fire represents a particular safety risk in tunnels due to the enclosed environment and restricted access for fire fighters in the event a fire does occur. As such, fire suppression systems form a critical safety component of any tunnel construction. In many cases, the first suppression system takes the form of a water deluge system which is capable of rapidly dispensing a large volume of water over a given target area. In contrast to fire sprinkler systems which include a network of sprinkler outlets maintained in a closed position until activated, a water deluge system has a dry side including a network of pipes and outlets which are maintained in an open condition and a wet side connected to a fire main or other water supply, the dry side and wet side of the water deluge system being separated by a valve, known as a deluge valve. When the deluge valve is opened, water enters the dry side of the water deluge system and is dispensed over the target area via the network of pipes and open nozzles until the deluge valve is closed.

Given the safety critical nature of fire suppression systems, the water deluge system must be subjected to regular testing and maintenance to ensure that the system is capable of operating effectively when needed. For example, typical problems with water deluge system include internal corrosion, corrosion deposits, any of which may restrict water flow in the pipe network and/or block nozzles of the water deluge system.

Conventional testing techniques involve a "wet test" whereby the water deluge system is activated for a test period and the water deluge system is manually checked for blocked or restricted nozzles by operators wearing appropriate personal protective equipment. This may involve placing a number of receptacles beneath specific areas of the water deluge system to collect dispensed water, the collected volume of water then being compared with the expected volume to determine whether the system is working within expected parameters.

Computer modelling systems have also been developed which model the specific water deluge system being tested, and calculate expected fluid pressures at nozzles using pressure sensors. Two locations are checked: near the inlet; and near the furthermost nozzle from the inlet. When the wet test is performed, the pressure readings taken are compared with the modelled pressure values to infer whether a problem exists.

There are a number of drawbacks with conventional techniques and equipment.

For example, conventional wet test techniques—including computer modelling systems—rely on wet tests being performed each and every time that information is required on the condition of the water deluge system. However, wet tests by their nature rely on large volumes of water being dispensed into operational areas. As such, it will be recognised that wet testing a tunnel, which in the case of many modern infrastructure tunnels may extend for significant distances and which in addition to the primary tunnel or tunnels may comprise a network of support and/or cross tunnels, will involve a significant amount of time where normal operations are restricted. In construction tunnels forming part of a transport infrastructure system, for example, such restrictions may have a significant impact on the operation of the system, cause congestion or loss of service and involve significant expense.

Water exposure from wet tests amongst other things can also cause: corrosion (e.g. corrosion under insulation and/or passive fire protection); accelerated damage to equipment (e.g. gratings, handrails, frames and the like); further degradation of deluge pipework (e.g. rust, silt, corrosion and the like); electrical integrity issues (e.g. blown transponders); require emergency shutdowns (e.g. due to water ingress); flooded cross passages & pits to become flooded; drains to overflow; damage to pressure control valve systems.

Also, personnel are liable to be exposed to the water flow and therefore must wear protective clothing which may impede their mobility and ability to perform their duties. For those conducting the wet test, wet tests may also increase the risk of injury due to poor visibility, higher risk of slipping, but also from dropped/water swept objects carried or entrained in the water flow.

SUMMARY

Aspects of the present disclosure relate to a method and apparatus for testing a tunnel fire suppression system, such as a water deluge system.

According to a first aspect, there is provided a method for testing a tunnel fire suppression system in the form of a water deluge system having a wet side and a dry side separated by a valve, the method comprising:
  providing a nozzle arrangement comprising a plurality of nozzles, each nozzle disposed in or coupled to an outlet of the water deluge system, wherein the nozzle arrangement comprises, is coupled to or operatively associated with a sensor arrangement configured to measure the pressure of air at each of the plurality of outlets of the water deluge system and output one or more output signals indicative of the pressure of the air at the one or more outlets;
  providing a supply of pressurised air through the water deluge system using a blower coupled to the water deluge system;
  measuring the pressure of the air at the one or more outlets of the water deluge system and outputting an output signal indicative of the pressure of the air at the one or more outlets;

conveying the output signal to a processing system configured to determine from said one or more output signals the flow rate of the air supply at the one or more outlets.

The present method obviates the requirement to carry out regular wet tests to verify that the water deluge system will operate effectively if and when required. This has a number of significant benefits. For example, the apparatus obviates the time, expense, and inconvenience involved in preparing for the wet test, as well as the time, expense, inconvenience and inaccuracies involved in performing the wet test. Personnel are also not exposed to water flow and are thus unimpeded in carrying out their duties. The ability of the apparatus to carry out a test of the water deluge system without the requirement for a wet test also reduces the risk of corrosion in the water deluge system and elsewhere in the tunnel. Moreover, environmental impact is reduced since no water is required; this being particularly beneficial where the tunnel is located in an area where water is scarce.

The method is capable of highlighting hydraulically underperforming zones of the water deluge system, e.g. zones having outlets which are blocked or restricted by construction debris or other blockage, such that rectification works can be carried out.

The method may comprise determining a condition of the water deluge system from the output signals from the outlets.

As described above, the apparatus comprises a nozzle arrangement comprising a plurality of nozzles.

At least one, and in particular embodiments all, of the nozzles may take the form of a metering nozzles.

The nozzle may comprise a nozzle portion. The nozzle portion may form an outlet of the nozzle. The nozzle portion may form a distal end of the nozzle.

The nozzle may comprise a flow tube portion.

The nozzle portion and the flow tube portion may be separate components.

The nozzle portion may be coupled to the flow tube portion. A proximal end portion of the nozzle portion may be configured for coupling to a distal end portion of the flow tube portion. The nozzle portion may be coupled to the flow tube portion by a coupling arrangement. The coupling arrangement may comprise or take the form of a thread connection. However, it will be understood that any suitable coupling arrangement may be used, including for example but not exclusively a bayonet-type fitting, adhesive bond, weld, interference fit, push-fit connection or the like.

Alternatively, the nozzle portion and the flow tube portion may be integrally formed.

The flow tube portion may be tubular or substantially tubular in construction. The length of the flow tube portion may be greater than the length of the nozzle portion.

The nozzle may be configured to receive the sensor associated with the outlet. The nozzle may comprise a radially extending tubular boss portion for receiving the sensor associated with the outlet. The boss portion may be formed or coupled to the flow tube portion.

The nozzle may further comprise a coupler portion for coupling the flow tube portion to the outlet.

The coupler portion may be configured for coupling to the flow tube portion.

A proximal end portion of the coupler portion may be configured for coupling to the outlet. For example, A proximal end portion of the coupler portion may be threaded and the coupler portion may be configured for coupling for the outlet via a threaded nut. However, it will be understood that any suitable coupling arrangement may be used, including for example but not exclusively a bayonet-type fitting, adhesive bond, weld, interference fit, push-fit connection or the like.

A proximal end portion of the flow tube portion may be configured for coupling to a distal end portion of the coupler portion. The coupler portion may be coupled to the flow tube portion by a thread connection. However, it will be understood that any suitable coupling arrangement may be used, including for example but not exclusively a bayonet-type fitting, adhesive bond, weld, interference fit, push-fit connection or the like.

Alternatively, the coupler portion and the flow tube portion may be integrally formed.

Beneficially, the elongate tubular flow tube portion acts to reduce measurement errors in the measurements obtained by the sensor. The flow tube portion may directs—or in other words straighten—the flow of air through the nozzle, reducing turbulence in the flow of air which would otherwise create unstable and eddying flow patterns at the location of the pressure transducer of the sensor associated with the outlet.

The method may comprise the step of coupling the nozzle arrangement to the outlets. In instances where existing nozzles are present, for example, the method may comprise the step of replacing the pre-existing nozzle arrangement with the above described nozzle arrangement.

The method may comprise measuring the flow rate of the air at an inlet, e.g. an input valve, of the water deluge system. The method may comprise outputting an output signal indicative of the flow rate of air at the inlet. The method may comprise conveying the output signal to a processing system The method may comprise comparing the output signal indicative of the flow rate of air at the inlet with the output signal(s) from the outlets.

The method may comprise determining a condition of the water deluge system from the compared output signals from the inlet and outlets.

The method may comprise determining a condition of the water deluge system by comparing the determined flow rate of the air at the one or more outlets to a reference signal. The reference signal may take the form of the flow rate of the air in the deluge system when the deluge system was commissioned or otherwise known to be free from obstructions.

The method may comprise coupling the apparatus of the first aspect to the water deluge system. For example, the method may comprise coupling the blower to the dry side of the water deluge system.

The method may comprise coupling the sensor arrangement to the water deluge system.

The method may comprise coupling sensors to a selected subset of the outlets of the water deluge system.

The method may comprise logging or recording the subset of locations.

The test period may be between 5 seconds and 120 seconds. For example, the test period may be between 15 seconds and 60 seconds. In particular embodiments, the test period may be 30 seconds.

The method may comprise comparing the results of the test with a previous wet test.

The method may comprise subsequently performing a wet test.

The method may comprise comparing the results of the test with the subsequent wet test.

The method may comprise performing a sequence test to verify flow directed to each of the open nozzles. The sequence test may comprise blocking one or a plurality of selected nozzles. Blocking of selected nozzles permits the air flow to be directed out through the open nozzles, leaving those that were blocked off reading a higher internal pressure. By inducing this higher pressure, it is possible to observe the sensor behaviour and monitor for any potential anomalies.

According to a second aspect, there is provided an apparatus for testing a water deluge system having a wet side and a dry side separated by a valve, the apparatus comprising:
  a blower or compressor configured for coupling to an inlet of the water deluge system, the blower or compressor configured to provide a supply of pressurised air through the water deluge system from the inlet to one or more outlet of the water deluge system;
  a nozzle arrangement comprising a plurality of nozzles, each nozzle disposed in or coupled to an outlet of the water deluge system, wherein the nozzle arrangement comprises, is coupled to or operatively associated with a sensor arrangement configured to measure the pressure of air at each of the plurality of outlets of the water deluge system and output one or more output signals indicative of the pressure of the air at the one or more outlets; and
  a communication arrangement configured to convey the one or more output signals from the sensor arrangement to a processing system configured to determine from said one or more output signals the flow rate of the air supply at the one or more outlets.

In use, the apparatus is operable to perform a test on the water deluge system by flowing low gauge pressure pressurised air through the water deluge system and measure the pressure of the air at one or more outlets, in particular but not exclusively a plurality of the outlets, of the water deluge system during a selected test time period.

The present apparatus obviates the requirement to carry out regular wet tests to verify that the water deluge system will operate effectively if and when required. This has a number of significant benefits. For example, the apparatus obviates the time, expense, and inconvenience involved in preparing for the wet test, as well as the time, expense, inconvenience and inaccuracies involved in performing the wet test. Personnel are also not exposed to water flow and are thus unimpeded in carrying out their duties. The ability of the apparatus to carry out a test of the water deluge system without the requirement for a wet test also reduces the risk of corrosion in the water deluge system and elsewhere in the tunnel. Moreover, environmental impact is reduced since no water is required; this being particularly beneficial where the tunnel is located in an area where water is scarce.

The apparatus is capable of highlighting hydraulically underperforming zones of the water deluge system, e.g. zones having outlets which are blocked or restricted by construction debris or other blockage, such that rectification works can be carried out.

As described above, the apparatus comprises a nozzle arrangement comprising a plurality of nozzles.

At least one, and in particular embodiments all, of the nozzles may take the form of a metering nozzles.

The nozzle may comprise a nozzle portion. The nozzle portion may form an outlet of the nozzle. The nozzle portion may form a distal end of the nozzle.

The nozzle may comprise a flow tube portion.

The nozzle portion and the flow tube portion may be separate components.

The nozzle portion may be coupled to the flow tube portion. A proximal end portion of the nozzle portion may be configured for coupling to a distal end portion of the flow tube portion. The nozzle portion may be coupled to the flow tube portion by a coupling arrangement. The coupling arrangement may comprise or take the form of a thread connection. However, it will be understood that any suitable coupling arrangement may be used, including for example but not exclusively a bayonet-type fitting, adhesive bond, weld, interference fit, push-fit connection or the like.

Alternatively, the nozzle portion and the flow tube portion may be integrally formed.

The flow tube portion may be tubular or substantially tubular in construction. The length of the flow tube portion may be greater than the length of the nozzle portion.

The nozzle may be configured to receive the sensor associated with the outlet. The nozzle may comprise a radially extending tubular boss portion for receiving the sensor associated with the outlet. The boss portion may be formed or coupled to the flow tube portion.

The nozzle may further comprise a coupler portion for coupling the flow tube portion to the outlet.

The coupler portion may be configured for coupling to the flow tube portion.

A proximal end portion of the coupler portion may be configured for coupling to the outlet. For example, A proximal end portion of the coupler portion may be threaded and the coupler portion may be configured for coupling for the outlet via a threaded nut. However, it will be understood that any suitable coupling arrangement may be used, including for example but not exclusively a bayonet-type fitting, adhesive bond, weld, interference fit, push-fit connection or the like.

A proximal end portion of the flow tube portion may be configured for coupling to a distal end portion of the coupler portion. The coupler portion may be coupled to the flow tube portion by a thread connection. However, it will be understood that any suitable coupling arrangement may be used, including for example but not exclusively a bayonet-type fitting, adhesive bond, weld, interference fit, push-fit connection or the like.

Alternatively, the coupler portion and the flow tube portion may be integrally formed.

Beneficially, the elongate tubular flow tube portion acts to reduce measurement errors in the measurements obtained by the sensor. The flow tube portion may directs—or in other words straighten—the flow of air through the nozzle, reducing turbulence in the flow of air which would otherwise create unstable and eddying flow patterns at the location of the pressure transducer of the sensor associated with the outlet.

Moreover, the apparatus occupies a relatively small footprint. This is particularly beneficial in a tunnel where space is typically limited and which may prevent conventional test equipment from being installed on a permanent basis.

The apparatus may comprise or take the form of a permanent installation on the tunnel to be tested. At least part of the apparatus may be configured to be permanently coupled to the water deluge system.

It will be recognised, however, that at least part of the apparatus may alternatively comprise or take the form of a temporary and/or retrofit installation on the tunnel to be tested. At least part of the apparatus may be configured to be removably coupled to the water deluge system.

The apparatus may comprise, may be coupled to, or operatively associated with, the processing system.

In some embodiments, the processing system, or part of the processing system, may form part of the apparatus. Alternatively or additionally, the processing system, or part of the processing system, may be coupled to or operatively associated with the system. For example, the processing system may be located at one or more remote location. The remote location may comprise or take the form of a mobile device such as tablet, mobile phone or the like. Alternatively or additionally, the remote location may comprise or take the form of a control room. Alternatively or additionally, the remote location may comprise or take the form of a data store, such as an online data store.

As described above, the processing system is configured to determine the flow rate of the air supply at the one or more outlets.

Testing a water deluge system involves assessing the density application rate of the system, that is whether the system is capable of delivering the required flow rate of water to a given application area in order to suppress a fire. The density application rate is given by:

$$\text{Density Application Rate} = \frac{\text{Flowrate from outlet}}{\text{Area of Coverage}}$$

The area of coverage is fixed and is determined by the design of the water deluge system and any modifications after installation. However, the flow rate from the outlet(s) can vary if restrictions are present within the water deluge system. At low gauge pressure, air replicates the flow of water. Thus, by determining the flow rate of the air from the one or more outlets Q (Litres/min), the deluge system can be tested without the requirement for wet tests.

The upstream flow rate and pressure are unique to the condition of the system, i.e. if pressure is plotted against flow rate, all points on the plot are unique to the condition of the system. This is particularly useful when plotted for a clean system.

The apparatus may be configured to operate in different modes. For example, the apparatus may be configured to operate in a "Find Restriction" mode. In the "Find Restriction" mode, the apparatus may gather data from some or all of the instrumentation for post processing and identification of restrictions. Alternatively or additionally, the apparatus may be configured to operate in a 'Flow Assurance" mode. In the "Flow Assurance" mode, the apparatus may only analyse the inlet values (e.g. pressure, flow rate, etc).

As described above, the apparatus comprises a blower or compressor configured for coupling to the water deluge system.

The blower or compressor may be configured or take the form of any device suitable for intaking air at a first pressure and exhausting air at a second, higher pressure. The blower or compressor may comprise or take the form of any device suitable for intaking air at atmospheric or about atmospheric pressure and providing an exhaust air supply to the water deluge system at higher air pressure than atmospheric pressure. For example but not exclusively, the pressure increase from intake to exhaust may be at or about 1.1, 1.2, or greater than 1.2, e.g. 4.

The blower or compressor may comprise a pump. The pump may take the form of a single stage pump. However, in particular embodiments the pump takes the form of a multi-stage pump, i.e. having a plurality of impeller stages. For example, the pump may comprise a four stage multi-stage pump. Alternatively, the pump may comprise an eight stage multi-stage pump. However, it will be recognised that the pump may comprise any suitable number of stages. The pump may take the form of a centrifugal pump. In particular embodiments, the blower comprises a multi-stage centrifugal pump. Beneficially, the multi-stage centrifugal pump provides a blower or compressor which is capable of directing a flow of air at high flow and relatively low gauge pressure, i.e., higher pressure than atmospheric pressure, into and through the water deluge system, and obviates or at least reduces the requirement for a gas source such as an accumulator, an air receiver such as a bank of compressed air cylinders and/or a pressure regulator skid.

The blower or compressor may comprise a motor. The motor may be coupled to the pump. The motor may be configured to drive the pump. The motor may be directly coupled to the pump. Alternatively, the motor may be indirectly coupled to the pump, for example via a transmission system. The transmission system may for example comprise a gearbox, a belt drive, or other suitable transmission system.

The blower or compressor may comprise, may be coupled to, or operatively associated with a variable frequency drive (VFD). Beneficially, the variable frequency drive permits fine control over the delivered pressure or flow rate from the blower or compressor.

The blower or compressor may comprise, or may be housed in, an enclosure. Accordingly, the apparatus may be utilised in hazardous areas—environments in which for example gases, vapours, mists and dust can form an explosive atmosphere with air.

In embodiments comprising a blower, the blower may be configured to provide exhaust air supply at a maximum gauge pressure of 0.7 bar and a flow rate of 0 $Ft^3$/min to 1000 $Ft^3$/min.

In embodiments comprising a blower, the blower may be capable of directing a flow of air at high flow and relatively low gauge pressure, i.e., higher pressure than atmospheric pressure but lower than high pressure air systems, into and through the water deluge system, and thus obviates or at least reduces the requirement for a gas source such as an accumulator, an air receiver such as a bank of compressed air cylinders and/or a pressure regulator skid.

The blower may occupy a relatively small footprint and/or may be relatively lightweight. For example, but not exclusively, the blower may occupy a space of approximately 2 m by approximately 2 m and may have a mass of less than 1500 kg.

The blower may comprise or take the form of an electric blower. Beneficially, the provision of an electrically powered blower permits the apparatus to be coupled to the electrical supply of the facility containing the water deluge system, and obviates the footprint on site and transportation requirements associated with a dedicated power supply, such as a generator.

However, it will be understood that in some instances the apparatus may comprise a dedicated power supply, such as a generator.

In embodiments comprising a compressor, the compressor may for example comprise or take the form of a 200 SCFM (Standard Cubic Feet/Minute) air compressor to a 2000 SCFM (Standard Cubic Feet/Minute) air compressor. In particular embodiments, the compressor may comprise or take the form of a 400 SCFM air compressor.

The apparatus may be configured to control the humidity of the air supply.

The apparatus may be configured to match the humidity of the air supply to the water deluge system when carrying out the test to a reference humidity. The reference humidity may take the form of the humidity of the air in the deluge system when the deluge system was commissioned or otherwise known to be free from obstructions.

The apparatus may comprise an air conditioner. The air conditioner may comprise or take the form of an air dryer. The air conditioner may be configured to output air at a temperature of or about—40 degrees C. The air conditioner may be configured to control the humidity of the air supply.

The apparatus may comprise a moisture filter. The moisture filter may be provided at an inlet of the blower or compressor. Beneficially, the provision of a moisture filter may permit the humidity of the air supply to the apparatus to be controlled.

The apparatus, in particular the processing system, may be configured to assess any error which may be induced by humidity and may indicate (if required) the minimum humidity level reduction required at the inlet which the blower may then provide.

The apparatus may be configured to determine the likelihood of condensation of the blown air in the deluge system. This may be achieved by mathematical processing of measured values which may include atmospheric humidity and temperature and the pressure and temperature at multiple locations, which may be at the sensor location(s)) in the deluge system.

The apparatus may comprise an air receiver. The air receiver may comprise or take the form of a storage accumulator. In particular embodiments, the air receiver may comprise a 4000 Litre capacity tank. However, it will be recognised that any suitable air receiver may be utilised.

The apparatus may comprise or may be coupled to a control valve. The control valve may comprise or take the form of a non-return valve. The control valve may comprise or take the form of a ball valve.

In use, the control valve may regulate the flow to the desired pressure required for the test operation.

The control valve may form or form part of pressure regulation unit of the apparatus.

The pressure regulation unit may be configured for coupling to the water deluge system, for example the valve, by a fluid conduit. The fluid conduit may comprise or take the form of a hose.

The apparatus may be coupled to the system by any suitable means. In particular embodiments, the apparatus may be coupled via one or more of: a drain line, a groove-lock clamp type tie-in, or by permanent modification to the deluge system.

The apparatus may be coupled to the system via the deluge valve. In particular embodiments, the apparatus may be coupled to the system via a drain-down valve located at the rear of the deluge valve. The apparatus may be coupled on the dry side of the drain-down valve.

As described above, the apparatus comprises a sensor arrangement coupled to or operatively associated with one or more outlets of the water deluge system, the sensor arrangement configured to measure the pressure of the air at the one or more outlets of the water deluge system and output one or more output signal indicative of the pressure of the air at the one or more outlets.

The sensor arrangement may comprise a sensor configured for coupling to or operatively associated with an outlet of the water deluge system.

The sensor arrangement comprises a plurality of sensors.

At least one of the sensors may be coupled to or operatively associated with an outlet of the water deluge system.

The sensor arrangement may comprise sensors coupled to or operatively associated with a subset of the outlets of the water deluge system.

Alternatively, the sensor arrangement may comprise sensors coupled to or operatively associated with all of the outlets of the water deluge system.

The sensor arrangement coupled to or operatively associated with one or more outlets of the water deluge system may be configured to measure temperature of the air at the one or more of the outlets.

The sensor arrangement may comprise one or more temperature sensor.

At least one of the sensors may be configured to be removably coupled to the water deluge system.

The sensor may comprise a connector for connecting the sensor to the associated outlet. The connector may comprise a threaded connector, a bayonet-type connector, or other suitable removable connector.

At least one of the sensors may be configured to be permanently coupled to the water deluge system.

The sensor may be integrally formed or coupled to the associated outlet.

The sensor may be bonded to the associated outlet, for example by an adhesive.

The sensor may comprise a battery, which may be rechargeable battery.

The sensor may comprise a sensor control module.

The sensor control module may control the state of the sensor.

For example, the sensor control module may control whether the sensor should be in an awake state or a sleep state.

As described above, the sensor arrangement is configured to measure the pressure of the air at one or more outlets of the water deluge system.

The sensor arrangement may comprise one or more pressure sensors.

The sensor arrangement may comprise at least one sensor coupled to or operatively associated with the inlet to the deluge system.

The sensor arrangement may comprise one or more sensor configured to measure the flow of the air at the inlet valve. The one or more sensor may comprise or take the form of a flow meter. The flow meter may comprise or take the form of a Coriolis flow meter.

The sensor arrangement may comprise one or more sensor configured to measure the pressure of the air at the inlet valve. The sensor may comprise or take the form of a pressure sensor.

The sensor coupled to or operatively associated with the inlet may be configured to measure temperature. The sensor may comprise a temperature sensor.

In use, at the upstream, inlet, end, the one or more sensor configured to measure flow rate of air may be used to measure either or both of volumetric and/or mass flow rate. At the downstream end, by fitting an additional flow device, the pressure sensor measurement may be used to derive the equivalent flow rate at the outlets.

The apparatus may comprise a filter arrangement. For example, the apparatus may comprise one or more particulate filter.

At least one, and in particular embodiments all of the sensors may be temperature compensated, such that there is therefore no or minimal measurement error as a result of variations in ambient temperature.

As described above, the apparatus comprises a communication arrangement configured to convey the one or more output signals from the sensor arrangement to the processing system.

The communication arrangement may comprise a communications module. The communications module may form part of the sensor, may be coupled to the sensor or may be operatively associated with the sensor of the sensor arrangement.

In particular embodiments, the communications module comprises a wireless communications module. The communications module may be configured to communicate over a cellular communications network, Wi-Fi, Bluetooth, ZigBee, NFC, IR, satellite communications, other internet enabling networks and/or the like.

Alternatively or additionally, the communications module may comprise a wired communications module. The communications module may be configured to communicate via Ethernet or other wired network or connections, via a telecommunications network such as a POTS, PSTN, DSL, ADSL, optical carrier line, and/or ISDN link or network and/or the like, via the cloud and/or via the internet, or other suitable data carrying network.

The communications module may be configured to communicate via optical communications such as optical wireless communications (OWC), optical free space communications or Li-Fi or via optical fibres and/or the like.

The communication arrangement may comprise a receiver configured to receive the output signal from the sensor arrangement. The communication arrangement may comprise a transmitter configured to transmit commands to the sensor arrangement, for example to the sensor control module. The communication arrangement may comprise a transceiver.

The communication arrangement may comprise a communications module. The communications module may form part of the sensor, may be coupled to the sensor or may be operatively associated with the sensor at the inlet valve.

In particular embodiments, the communications module comprises a wireless communications module. The communications module may be configured to communicate over a cellular communications network, Wi-Fi, Bluetooth, ZigBee, NFC, IR, satellite communications, other internet enabling networks and/or the like.

Alternatively or additionally, the communications module may comprise a wired communications module. The communications module may be configured to communicate via Ethernet or other wired network or connections, via a telecommunications network such as a POTS, PSTN, DSL, ADSL, optical carrier line, and/or ISDN link or network and/or the like, via the cloud and/or via the internet, or other suitable data carrying network.

The communications module may be configured to communicate via optical communications such as optical wireless communications (OWC), optical free space communications or Li-Fi or via optical fibres and/or the like.

The sensor at the inlet valve may comprise a receiver. The sensor at the inlet valve may comprise a transmitter. The sensor at the inlet valve may comprise a transceiver.

The communication arrangement may comprise a receiver configured to receive the output signal from the sensor at the inlet valve. The communication arrangement may comprise a transmitter configured to transmit commands to the sensor at the inlet valve, for example to the sensor control module. The communication arrangement may comprise a transceiver.

The apparatus may comprise, may be coupled to, or operatively associated with a data acquisition device.

The data acquisition device may be coupled to, or may communicate with, the sensor arrangement wirelessly. The data acquisition device may be configured to communicate over a cellular communications network, Wi-Fi, Bluetooth, ZigBee, NFC, IR, satellite communications, other internet enabling networks and/or the like.

Alternatively or additionally, the data acquisition device may communicate via Ethernet or other wired network or connections, via a telecommunications network such as a POTS, PSTN, DSL, ADSL, optical carrier line, and/or ISDN link or network and/or the like, via the cloud and/or via the internet, or other suitable data carrying network.

The data acquisition device may be configured to communicate via optical communications such as optical wireless communications (OWC), optical free space communications or Li-Fi or via optical fibres and/or the like.

The data acquisition device may be coupled to and/or may communicate with a control room console on the facility. The communication arrangement is configured to convey the output signal to a data acquisition device. Alternatively or additionally, the data acquisition device may be coupled to and/or may communicate with a remote facility. Alternatively or additionally, the data acquisition device may be coupled to and/or may communicate with a mobile device, such as a phone, tablet device or the like.

The apparatus may comprise, or may communicate with a control system.

The control system may determine the condition of the water deluge system from the output signals from the sensors.

The control system may form part of the data acquisition device, or may comprise a separate system located on the facility, at a remote facility and/or may be a cloud based system.

The control system may be configured to control operation of the inlet valve. Beneficially, automatic control of the inlet valve removes the requirement for manual operation which leads to inaccuracies in the test results.

The control system may be configured to control operation of the deluge valve.

The processing system may form part of the control system.

The apparatus may comprise instrumentation configured to measure one or more of: blower speed, atmospheric temperature, pressure, humidity, temperature, humidity and pressure at the inlet side of the blower, temperature, pressure and humidity at the outlet side of the blower, flow rate at the outlet side of the blower which may be both volumetric and mass. The blower speed may also be used to derive volumetric flow rate and/or mass flow rate.

Multiple redundancy of the instrumentation may be provided. For example, the apparatus may comprise a plurality of instruments for measuring at least one of the above properties of the apparatus. The instruments for measuring at least one of the above properties of the apparatus may be located at one or more location, and in particular at each locations where the instrumentation is provided.

The apparatus may be configured to record data from the instrumentation described for a fixed air flow rate or air pressure of for a variable flow rate or pressure. An example of the latter would be the apparatus recording data from the instrumentation as the flow rate is varied continuously between a lower and an upper limit. This may equally apply to either or both testing of a new unrestricted system or a system which may be restricted.

The apparatus may be configured to provide pressure zoning. For example, this may involve analysing a section of the deluge system by analysis of test results where the pressure at an upstream location is targeted which may be the pressure at the same location for the deluge system when it was unrestricted/clean.

Beneficially, this pressure zoning simplifies the analysis of deluge system test.

The sensor arrangement may comprise one or more sensors located at junction or intersections of the pipe network of the water deluge system. This may facilitate the sensors the pressure zoning described above.

According to a third aspect, there is provided a water deluge system comprising the apparatus of the second aspect.

The water deluge system comprises a dry side and a wet side separated by a deluge valve, the dry side of the water deluge system having a network of pipes and outlets which are maintained in an open condition.

The water deluge system may comprise a plurality of outlets. The outlet or outlets of the water deluge system may comprise or take the form of nozzles.

According to a fourth aspect, there is provided a tunnel comprising the water deluge system of the third aspect.

The tunnel may comprise or take the form of a motorway tunnel. The tunnel may comprise or take the form of a rail tunnel.

According to a fifth aspect, there is provided a method, comprising:
    performing the test method of the first aspect at a first time period to provide a first test data set indicative of the condition of the water deluge system;
    performing the test method of the first aspect or a wet test at a second time period to provide a second test data set indicative of the condition of the water deluge system; and
    outputting the first data set and the second data set.

The method may comprise performing a comparison of the first data set and the second data to determine a condition of the water deluge system.

Beneficially, the method permits the condition of the water deluge system to be monitored.

According to another aspect, there is provided a processing system configured to implement one or more of the previous aspects.

The processing system may comprise at least one processor. The processing system may comprise and/or be configured to access at least one data store or memory. The data store or memory may comprise or be configured to receive operating instructions or a program specifying operations of the at least one processor. The at least one processor may be configured to process and implement the operating instructions or program.

The at least one data store may comprise, and/or comprise a reader, drive or other means configured to access, optical storage or disk such as a CD or DVD, flash drive, SD device, one or more memory chips such as DRAMs, a network attached drive (NAD), cloud storage, magnetic storage such as tape or magnetic disk or a hard-drive, and/or the like.

The processing system may comprise a network or interface module. The network or interface module may be connected or connectable to a network connection or data carrier, which may comprise a wired or wireless network connection or data carrier, such as a data cable, powerline data carrier, Wi-Fi, Bluetooth, Zigbee, internet connection or other similar connection. The network interface may comprise a router, modem, gateway and/or the like. The system or processing system may be configured to transmit or otherwise provide the audio signal via the network or interface module, for example over the internet, intranet, network or cloud.

The processing system may comprise a processing apparatus or a plurality of processing apparatus. Each processing apparatus may comprise at least a processor and optionally a memory or data store and/or a network or interface module. The plurality of processing apparatus may communicate via respective network or interface modules. The plurality of processing apparatus may form, comprise or be comprised in a distributed or server/client based processing system.

According to another aspect, there is provided a computer program product configured such that when processed by a suitable processing system configures the processing system to implement one or more of the previous aspects.

The computer program product may be provided on or comprised in a carrier medium. The carrier medium may be transient or non-transient. The carrier medium may be tangible or non-tangible. The carrier medium may comprise a signal such as an electromagnetic or electronic signal. The carrier medium may comprise a physical medium, such as a disk, a memory card, a memory, and/or the like.

According to another aspect, there is provided a carrier medium, the carrier medium comprising a signal, the signal when processed by a suitable processing system causes the processing system to implement one or more of the previous aspects.

It will be well understood by persons of ordinary skill in the art that whilst some embodiments may implement certain functionality by means of a computer program having computer-readable instructions that are executable to perform the method of the embodiments. The computer program functionality could be implemented in hardware (for example by means of a CPU or by one or more ASICs (application specific integrated circuits)) or by a mix of hardware and software.

Whilst particular pieces of apparatus have been described herein, in alternative embodiments, functionality of one or more of those pieces of apparatus can be provided by a single unit, processing resource or other component, or functionality provided by a single unit can be provided by two or more units or other components in combination. For example, one or more functions of the processing system may be performed by a single processing device, such as a personal computer or the like, or one or more or each function may be performed in a distributed manner by a plurality of processing devices, which may be locally connected or remotely distributed.

The invention is defined by the appended claims. However, for the purposes of the present disclosure it will be understood that any of the features defined above or described below may be utilised in isolation or in combination. For example, features described above in relation to one of the above aspects or below in relation to the detailed description below may be utilised in any other aspect, or together form a new aspect.

BRIEF DESCRIPTION OF THE DRAWINGS

These and other aspects will now be described, by way of example only, with reference to the accompanying drawings, in which.

DETAILED DESCRIPTION OF THE DRAWINGS

Figure 1:
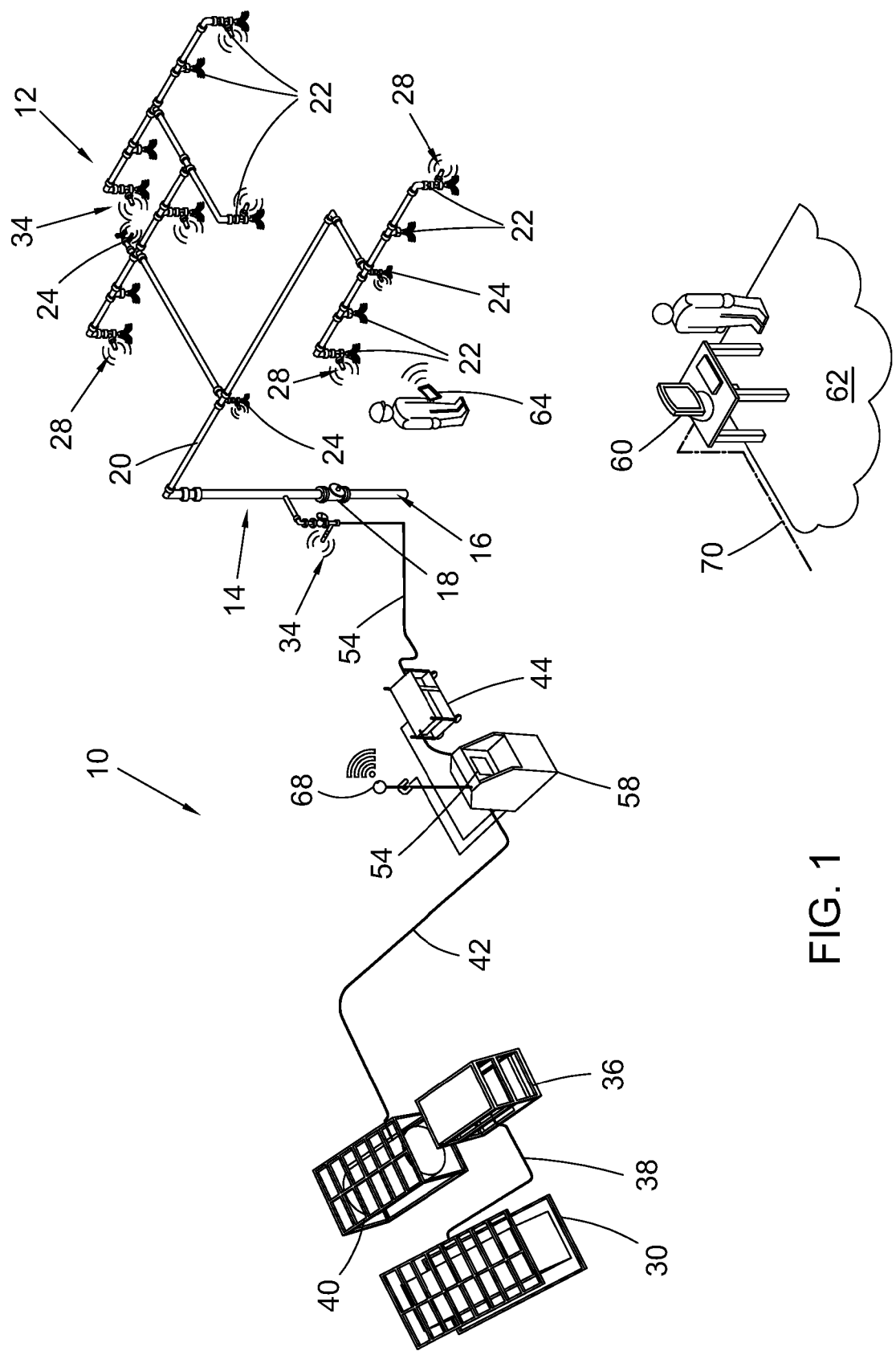
FIG. 1 shows a diagrammatic view of an apparatus for testing a water deluge system.
Figure 2:
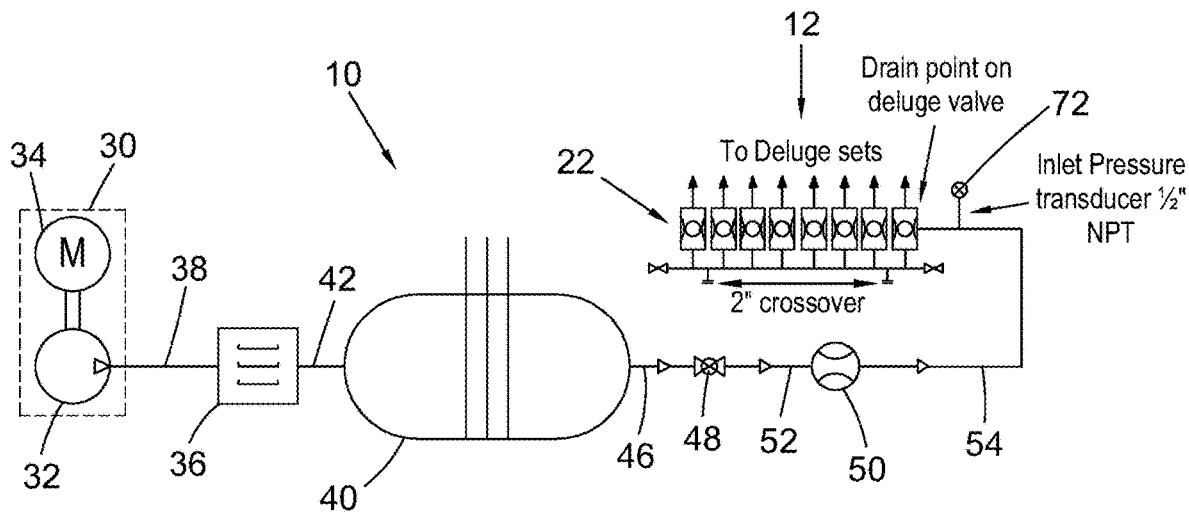
FIG. 2 shows a schematic view of the apparatus shown in FIG. 1.

Referring first to FIGS. 1 and 2 of the accompanying drawings, there is shown an apparatus 10 for testing a tunnel fire suppression system in the form of a water deluge system 12.

As shown, the water deluge system 12 comprises a dry side 14 and a wet side 16 separated by deluge valve 18. The dry side 14 includes a pipe network 20 and a number of outlets 22, known collectively as a deluge set. The apparatus 10 comprises a nozzle arrangement, generally denoted 24, including a discharge nozzle 26 disposed in the outlets 22. For clarity, not all of the outlets 22 and nozzles 26 are labelled in FIG. 1. The nozzle arrangement 24 comprises, is coupled to or operatively associated with a sensor arrangement, generally denoted 28, configured to measure the pressure of air at each of the plurality of outlets 22 of the water deluge system 12 and output one or more output signals indicative of the pressure of the air at the one or more outlets 22.

The illustrated apparatus 10 comprises a compressor 30, which in the illustrated apparatus 10 takes the form of a 400 SCFM (Standard Cubic Feet/Minute) air compressor. However, it will be recognised that the compressor may take any suitable form, and may for example but not exclusively comprise or take the form of a 200 SCFM (Standard Cubic Feet/Minute) air compressor to a 2000 SCFM (Standard Cubic Feet/Minute) air compressor.

The compressor 30 is rated for Zone 2, as set out in the Dangerous Substances and Explosive Atmospheres Regulations 2002 (DSEAR). As shown in FIG. 2, the compressor 30 comprises a pump 32 and a motor 34 for driving the pump 32.

In use, the compressor 30 is configured to intake air at atmospheric pressure and provide an exhaust air supply to the water deluge system 12 at higher air pressure than atmospheric pressure into and through the water deluge system 12.

As shown in FIGS. 1 and 2, the apparatus 10 comprises an air conditioner 36. The air conditioner 36 is coupled to the compressor 30 by a fluid conduit 38. In the illustrated apparatus 10, the air conditioner 36 takes the form of an air dryer. The air conditioner 36 is also rated for Zone 2, as set out in the Dangerous Substances and Explosive Atmospheres Regulations 2002 (DSEAR).

In use, the air conditioner 36 is configured to output air at a temperature of or about—40 degrees C. The air conditioner 36 may be configured to control the humidity of the air supply to the deluge system 12.

The apparatus 10 comprises an air receiver 40, which in the illustrated apparatus 10 takes the form of one or more storage accumulator. The air receiver 40 is coupled to the air conditioner 36 by a fluid conduit 42 (shown in FIG. 2). In the illustrated apparatus 10, the air receiver 40 comprises a 4000 Litre capacity tank. However, it will be recognised that any suitable air receiver may be utilised.

As shown in FIG. 1, the apparatus 10 comprises a pressure regulation unit 44. The pressure regulation unit 44 is coupled to the air receiver 40 by a fluid conduit 46.

The pressure regulation unit 44 comprises a control valve 48 (shown in FIG. 2). In the illustrated apparatus 10, the control valve 48 takes the form of a ball valve. In use, the control valve 48 regulates the flow to the desired pressure required for the test operation. The pressure regulation unit 44 is rated for Zone 1, as set out in the Dangerous Substances and Explosive Atmospheres Regulations 2002 (DSEAR).

As shown in FIG. 2, the apparatus 10 comprises a flow meter 50. The flow meter 50 is configured to measure the flow rate of the air supplied to the water deluge system 12. In the illustrated apparatus 12, the flow meter 50 takes the form of a Coriolis flow meter. The flow meter 50 is coupled to the control valve 48 by a fluid conduit 52 and to the water deluge system 12 by a fluid conduit 54.

As shown in FIG. 1, the apparatus 10 comprises a digital acquisition (DAQ) device 56 which communicates with a control console 58. The digital acquisition device 56 and/or the control console 58 are rated for Zone 1, as set out in the Dangerous Substances and Explosive Atmospheres Regulations 2002 (DSEAR). The control console 58 may communicate with a console 60 in a control room 62. In the illustrated apparatus 10, the control console 58 is integral to the apparatus 10. However, it will be understood that the control console 58 may alternatively be remote from the apparatus 10. As an alternative to or in addition to the console 58, the apparatus 10 may comprise a mobile device 64 which communicates with one or more of the control console 58, the control console 60, the sensor arrangement 28 or other components of the apparatus 10. In the illustrated apparatus 10, the mobile device 64 takes the form of a tablet. However, it will be recognised that the mobile device 64 may alternatively comprise any suitable mobile device such as a mobile telephone or the like. In use, the apparatus 10 may, for example, relay information relating the deluge system 12, the dry test process or recommended remedial actions to a user via the mobile device 64.

In use, and as will be described further below, the compressor 30 is operable to provide a supply of air at higher pressure than atmospheric pressure into and through the water deluge system 12, the sensor arrangement 28 operable to measure the pressure of the air at the outlets 22 of the water deluge system 12 and output an output signal indicative of the pressure of the air at the associated outlet 22, which is then communicated wirelessly by a wireless communication arrangement, represented by arrows 66, to the data acquisition device 56 via a wireless receiver 68. The wireless receiver 68 is also rated for Zone 1, as set out in the Dangerous Substances and Explosive Atmospheres Regulations 2002 (DSEAR).

In the illustrated apparatus 10, the data acquisition device 56 communicates with the control console 60 by optic line 70, although it will be recognised that any suitable means may be utilised to communicate with the control console 58, including wireless communication means.

The ability of the apparatus 10 to carry out a test of the water deluge system 12 without the requirement for a wet test has a number of significant benefits. For example, the apparatus 10 obviates the time, expense, and inconvenience involved in preparing for the wet test, such as arranging receptacles to collect dispensed water from the water deluge system 12, as well as the time, expense, inconvenience and inaccuracies involved in performing the wet test. Personnel are also not exposed to water flow and are thus unimpeded in carrying out their duties. The ability of the apparatus 10 to carry out a test of the water deluge system 12 without the requirement for a wet test also reduces the risk of corrosion.

As described above, the apparatus 10 comprises a sensor arrangement 28 operable to measure the pressure of the air at the outlets 22 of the water deluge system 12 and output an output signal indicative of the pressure of the air at the associated outlet 22.

Figure 3:
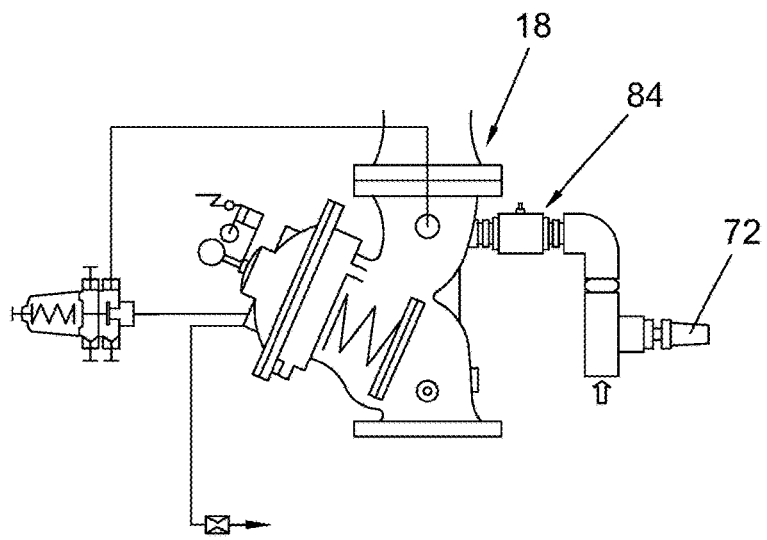
FIGS. 3, 4, 5, 6 and 7 show sensors of the sensor arrangement of the apparatus shown in FIG. 1.
Figure 4:
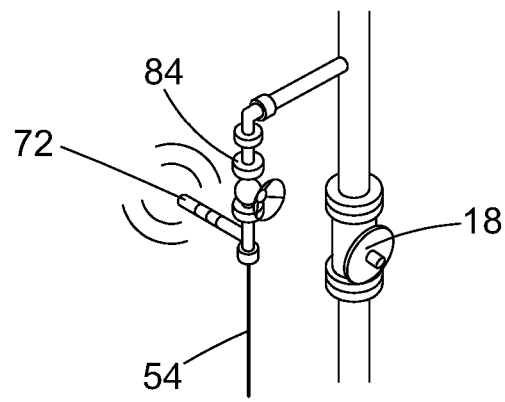
Figure 5:
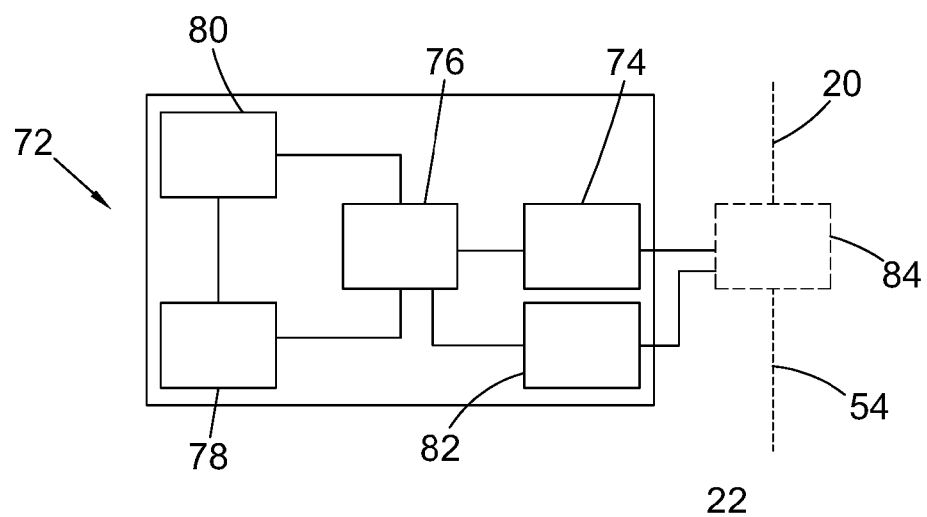

As shown in FIG. 1 and referring now also to FIGS. 3, 4 and 5 of the accompanying drawings, in addition to the sensor arrangement 28 being configured to measure the pressure of air at each of the plurality of outlets 22 of the water deluge system 12 comprises a sensor 72 coupled to deluge valve 18, the sensor 72 operable to measure the pressure of the air at the deluge valve 18 and output an output signal indicative of the pressure of the air at the deluge valve 18.

As shown in FIG. 5, the sensor 72 comprises a pressure transducer 74, a sensor control module 76, a rechargeable battery 78 and a wireless communications transceiver 80. The pressure transducer 74 is configured to measure the pressure of the air at the deluge valve 18 of the water deluge system 12 which is communicated wirelessly to the data acquisition device 56 by the transceiver 80. The sensor control module amongst other control functions may control whether the sensor 72 should be in an awake state or a sleep state. The illustrated sensor 72 further comprises a temperature sensor 82 for measuring temperature and this data may also be transmitted and used by the apparatus 10 for beneficial analysis purposes, for example the calculation of the dew point temperature of the air at the sensor 72.

As shown in FIGS. 1 and 3, the apparatus 10 is coupled to the deluge valve 18 of the water deluge system 12 and more particularly to the dry side of a drain-down valve 84 of the deluge valve 18. The sensor 72 is also coupled to or operatively associated with the dry side of the drain-down valve 84.

Figure 6:
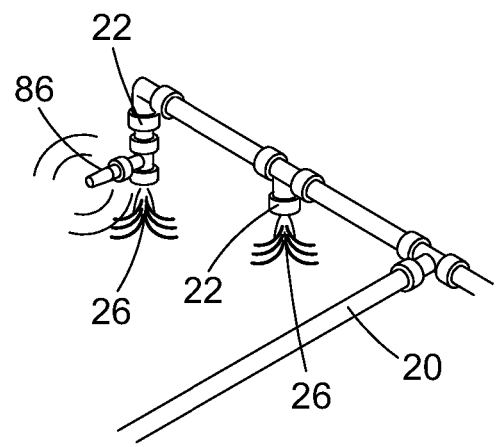
Figure 7:
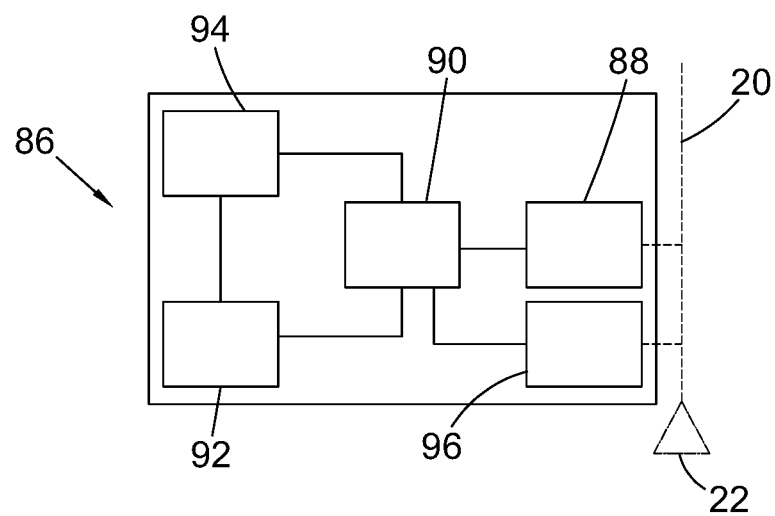
Figure 8:
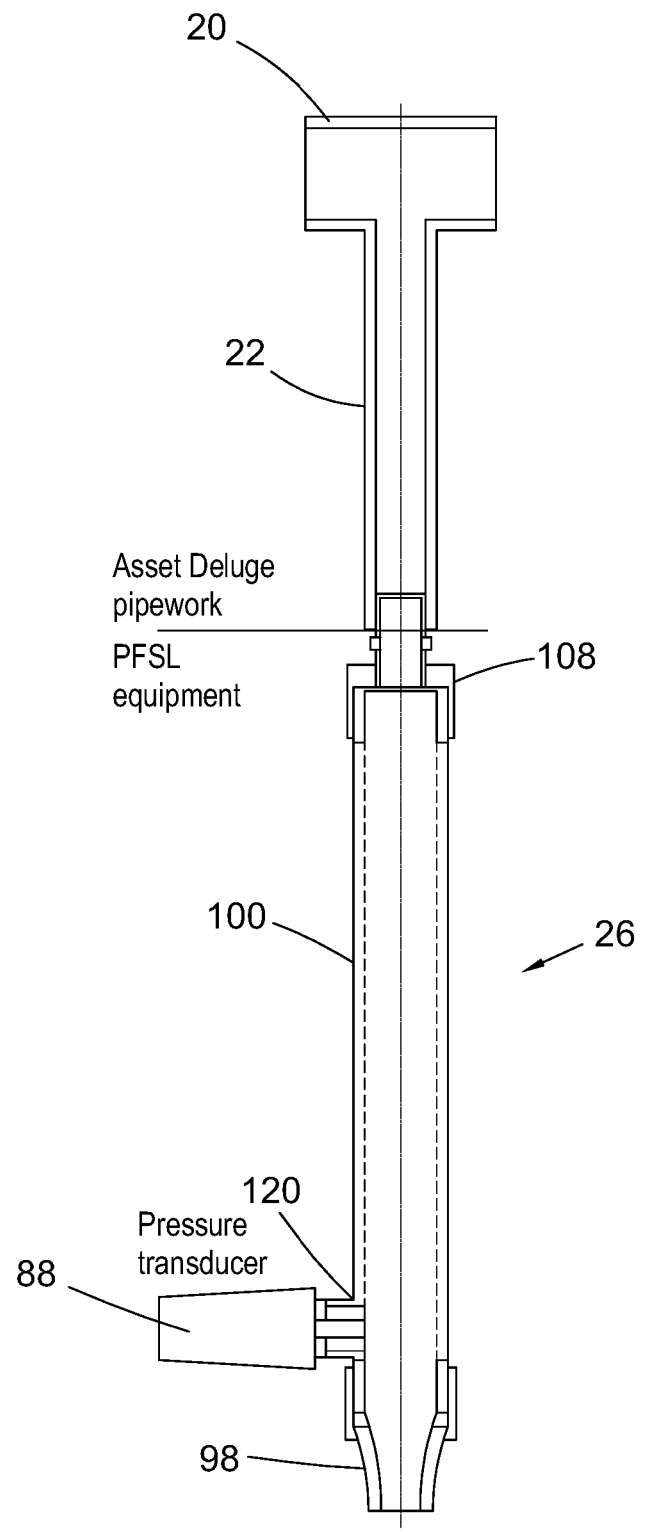
FIGS. 8 to 14 show a metering nozzle of the apparatus shown in FIG. 1.
Figure 9:
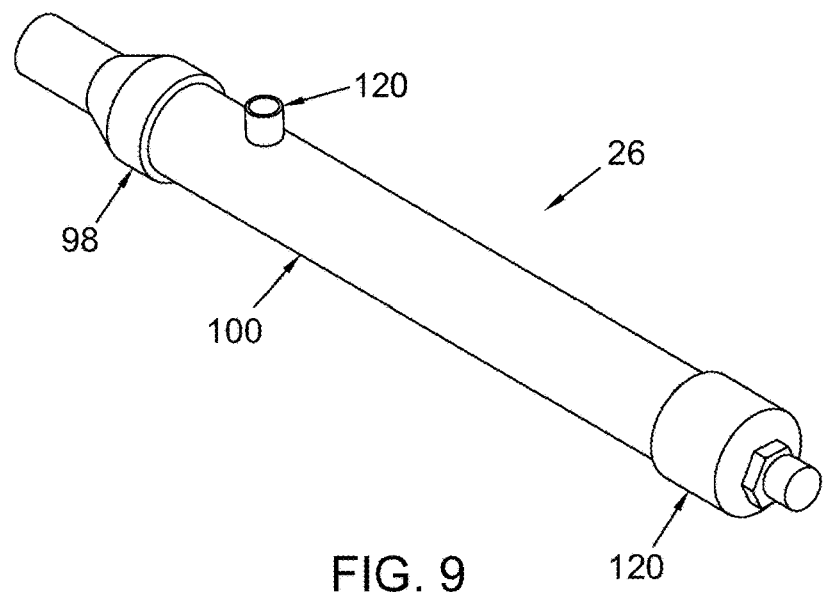
Figures 10, 11:
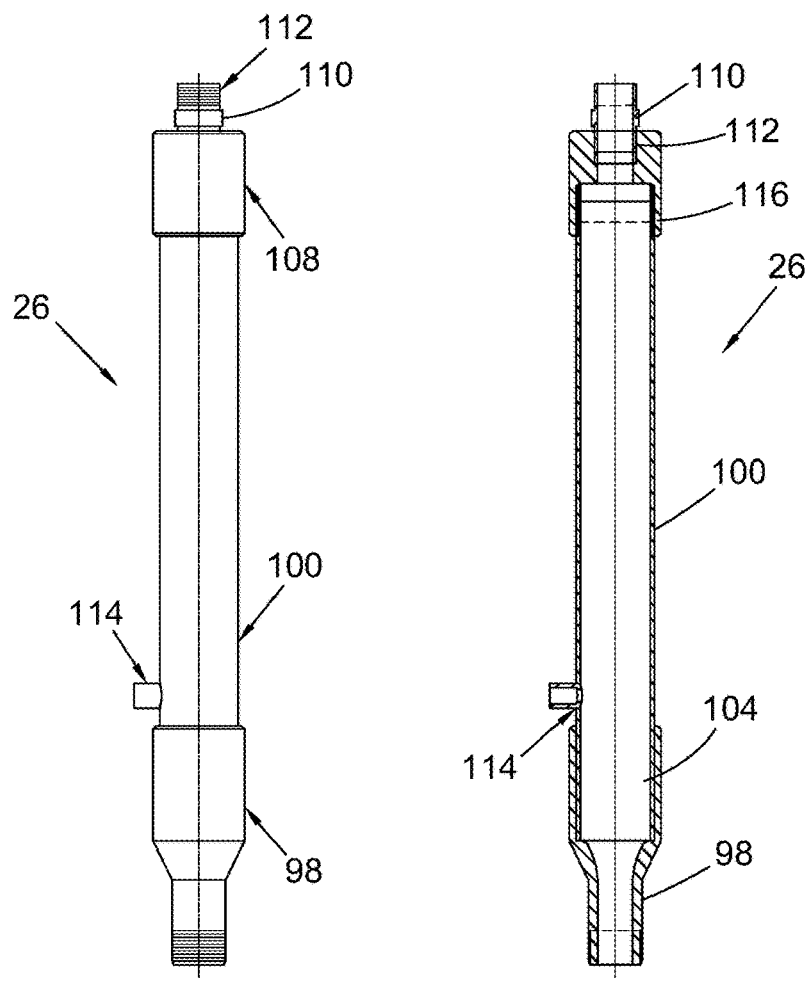
Figure 12:
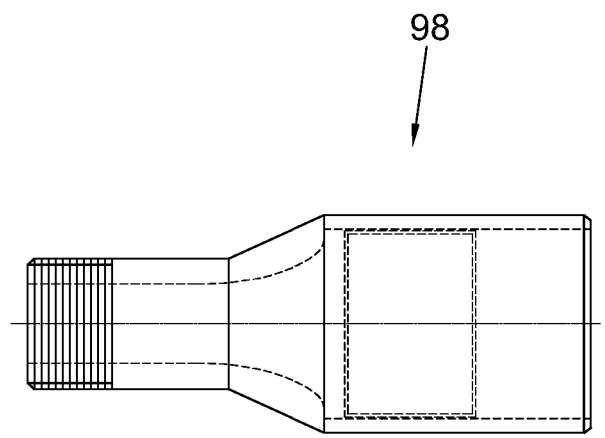
Figure 13:
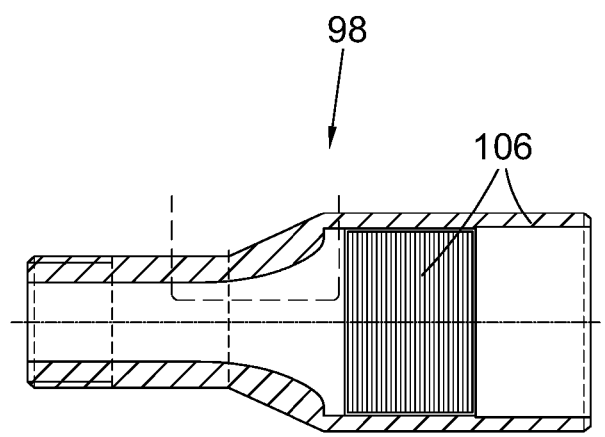
Figure 14:
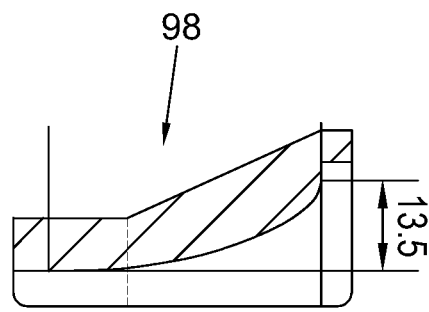

Referring now to FIGS. 6 and 7 of the accompanying drawings, the sensor arrangement 28 comprises sensors 86 for measuring the pressure of the air at the outlets 22. As shown in FIG. 7, the sensor 86 comprises a pressure transducer 88, a sensor control module 90, a rechargeable battery 92 and a wireless communications transceiver 94.

The pressure transducer 88 is configured to measure the pressure of air at the outlet 22 which is then communicated wirelessly to the data acquisition device 56 by the transceiver 94. The sensor control module 90 amongst other control functions may control whether the sensor 86 should be in an awake state or a sleep state. The illustrated sensor 86 further comprises a temperature sensor 96 for the sensor measuring temperature and this data may also be transmitted and used by the apparatus 10 for beneficial analysis purposes, for example the calculation of the dew point temperature of the air at the sensor 86.

As the air exits the outlets 22, the pressure of the air is measured by the sensors 86 disposed at the outlets 22. The transceivers 94 of the sensors 86 are then operable to transmit an output signal to the data acquisition device 56 via the wireless receiver 68.

The transceivers 80, 94 together with the wireless receiver 68 form the communication arrangement 66 of the apparatus 10.

As described above, and referring now also to FIGS. 8 to 14 of the accompanying drawings, the apparatus 10 comprises a nozzle arrangement 24 comprising a plurality of discharge nozzles 26, which in the illustrated apparatus 10 take the form of metering nozzles.

As shown, each discharge nozzle 26 comprises a nozzle portion 98 which forms an outlet of the discharge nozzle 26 and a flow tube portion 100.

The nozzle portion 98 forms a distal end of the discharge nozzle 26. The nozzle portion 98 is coupled to the flow tube portion 100. A proximal end portion 102 of the nozzle portion 98 is configured for coupling to a distal end portion 104 of the flow tube portion 100. In the illustrated discharge nozzle 26, the nozzle portion 98 is coupled to the flow tube portion 100 by thread connection 106.

The flow tube portion 100 is tubular or substantially tubular in construction. The length of the flow tube portion 100 is greater than the length of the nozzle portion.

The discharge nozzle 26 further comprises a coupler portion 108 for coupling the flow tube portion 100 to the outlet 22.

The coupler portion 108 is coupled to the flow tube portion 100. In the illustrated discharge nozzle 26, the coupler portion 108 is coupled to the flow tube portion 100 by threaded nut 110 engaging thread connection 112.

The discharge nozzle 26 is configured to receive the sensor 86. The discharge nozzle 26 comprises a radially extending tubular boss portion 114 for receiving the sensor 86. The boss portion 114 is formed or coupled to the flow tube portion 100.

Beneficially, the elongate tubular flow tube portion 110 acts to reduce measurement errors in the measurements obtained by the sensor 86. The flow tube portion 110 directs—or in other words straightens—the flow of air through the discharge nozzle 26, reducing turbulence in the flow of air which would otherwise create unstable and eddying flow patterns at the location of the pressure transducer 88.

When it is desired to carry out the test, the compressor is activated to provide a supply of air at higher pressure than atmospheric pressure into and through the dry side 14 of the water deluge system 12 over a test period. As the air is at a higher pressure than the air at atmospheric pressure present within the open dry side 14 of the water deluge system 12 the air flows through the pipe network 20 to the outlets 22 where it exits the deluge system 12. The sensor 72 is configured to measure the measure the pressure of the air at the deluge valve 18 of the water deluge system 12 which is communicated wirelessly to the data acquisition device 56 by transceiver 80. The sensors 86 coupled to the outlets 22 of the water deluge system 12 measure the pressure of the air at the outlets 22 of the water deluge system 12 and output an output signal indicative of the pressure of the air at the outlets 22.

The method may then comprise determining a condition of the water deluge system 12 from the acquired data. This may involve comparing the data at the deluge valve 18 with the data measured at the outlets 22. Alternatively, or additionally, the air pressure data measured at the outlets 22 may be compared with a previous test using the apparatus 10 or with previous wet test data. In this way, the condition of the water deluge system may also be monitored over time, either periodically or on a continuous basis in a manner not previously possible.

As described above, the ability of the apparatus 10 to carry out a test of the water deluge system 12 without the requirement for a wet test has a number of significant benefits. For example, the apparatus obviates the time, expense, and inconvenience involved in preparing for the wet test, such as arranging receptacles to collect dispensed water from the water deluge system 12 and in bagging sensitive equipment, as well as the time, expense, inconvenience and inaccuracies involved in performing the wet test. Personnel are also not exposed to water flow and are thus unimpeded in carrying out their duties. The ability of the apparatus 10 to carry out a test of the water deluge system 12 without the requirement for a wet test also reduces the risk of corrosion in the water deluge system 12 and elsewhere in the installation.

A sample calculation explaining how water flow rate can be determined by measurement of air pressure is explained for a simplified system below. For incompressible flow the pressure drop in a pipe is typically given by the Darcy Weisbach equation. The present tests are performed at very low pressure, typically with nozzle outlet pressures of less than 0.1 bar above atmospheric pressure. At these low pressures the Mach number is very low e.g. less than 0.1. At very low Mach numbers the air can be said to be in an incompressible flow regime. In reality there is compression, but the difference between using more complex compressible flow calculations and incompressible flow calculations is less than 1% error. Therefore incompressible flow calculations can used to simplify analysis.

Consider a simple pipe with a nozzle at its end. The pressure loss across this pipe is calculated by:

$$\Delta P_{AB} = \frac{4 \times ff \times L}{d} \times \frac{1}{2} \times \rho \times \mu^2$$

Where:

L=Length of Pipe

D=Diameter of Pipe

μ=Velocity of fluid

ρ=Density of Fluid ff=friction factor of pipe

To determine the ratio between water pressure loss and air pressure loss constants can be removed $$\Delta P_{AB} = \frac{\cancel{4 \times ff \times L}}{\cancel{d}} \times \cancel{\frac{1}{2}} \times \rho \times \mu^2$$

Therefore giving $$\frac{\Delta P_{AB\ Water}}{\Delta P_{AB\ Air}} = \frac{\rho_{Water} \times \mu^2_{Water}}{\rho_{Water} \times \mu^2_{Air}}$$

Typically seawater is used for deluge testing therefore:

$P_{Water}$=1027 kg/m3

$P_{Air}$=1.225 kg/m3

$\mu_{Water}$=6 m/sec (typically fire systems are design to avoid flow velocities higher than 6 m/sec $\mu_{Air}$=25 m/sec (equivalent air velocity for dry-flo testing)

Therefore:

$$\frac{\Delta P_{AB\ Water}}{\Delta P_{AB\ Air}} = \sim 50$$

The following is a simplified demonstration of the comparison between air and water pressure losses.

| Condition | Pressure at A (bar) | Pressure loss through pipe (bar) | Pressure at B (bar) |
|---|---|---|---|
| Initial Wet Test/ Hydraulic Simulation (Example Values) | 2 | 0.2 | 1.8 |
| Master Dry Test (Example Values) | 0.04 | 0.004 | 0.036 |

An initial wet test is performed to commission the system 12. During this time the density application rate is verified and spray pattern verified as fit for purpose. Typically testing is performed against the expected outputs from a hydraulic modelling package.

Once the system 12 has been verified and the pressure losses in water determined for the pipe network, a dry test using the apparatus 10 is performed which then determines the losses in air, this is known as the Master signature.

After a period of time, for example 1 year, a further dry test using the apparatus is performed, however now there is debris built up within the line (e.g. a spurious release swept marine debris into the pipework).

With the same inlet pressure at A the pressure losses are higher due to the restriction within the line leading to a lower outlet pressure.

| Condition | Pressure at A (bar) | Pressure loss through pipe (bar) | Pressure at B (bar) |
|---|---|---|---|
| Second Dry-flow Test (Example values) | 0.04 | 0.028 | 0.012 |

The pressure at B for the same inlet pressure at A would now be:

$P_{AB\ Water} = \sim 50 \times P_{AB\ Air}$ $P_{AB\ Water} = \sim 50 \times 0.012 = 0.6$ bar If the nozzle at B had a typical K factor of 25 the flow rate at B during initial test was:

$$Q\left(\frac{\text{liters}}{\text{min}}\right) = 23\sqrt{P_{B\ Water}}$$

$$Q\left(\frac{\text{liters}}{\text{min}}\right) = 23\sqrt{1.8} = 30\ \text{L/min}$$

But is now $$Q\left(\frac{\text{liters}}{\text{min}}\right) = 23\sqrt{0.6} = 17\ \text{L/min}$$

Accordingly, the above allows the condition of the deluge system to verified.

An example of a test regime employing the apparatus is described below.

On first application, a wet test and/or an inspection is carried out to the deluge system 12 to determine whether the deluge system 12 is in good condition, to determine whether the nozzles are seeing the correct pressures, to determine how long it takes for the most remote nozzle to reach the desired pressure, to determine whether the spray pattern is correct, and to determine whether the flow in L/m²/min. The drains (not shown) may also be checked to ensure they are functioning correctly.

The pressure at the inlet and outlet nozzles to which the sensor arrangement 26 of the apparatus 10 is measured.

The apparatus 10 is operated to remove the water by flowing at maximum rate, for example for 5 minutes to 20 minutes depending on the size of the deluge system 12.

The compressor 30 slowly sweeps up through flow until it reaches maximum pressure. The sensor arrangement 28 monitors the pressure and the communication arrangement relays the detected pressure data to the processing system, control station and/or data store. This forms a master signature for the system 12.

The apparatus 10 is operable to check for problems in the pipework or nozzles by breaking the system 12 down into sections. By breaking the system 12 into distinct sections, the apparatus creates a priority list for operators if problems are found depending on the severity of a given restriction.

It will be recognised that the inlet pressure recorded during the master signature ramp is a unique property of a clean system. Thus, if a new signature pressure response is matched to the master signature then there are no restrictions.

The pressure output of the compressor 30 is then reduced so that the compressor 30 enters the incompressible flow regime. The apparatus 10 is then operated and the flow for the particular test determined as described above.

The airflow requirement for testing will change for different systems, however for an example 12 nozzle system it is estimated that approximately 200 ft³/min compressed air will be required at 0.25 Bar at the nozzles.

The pressure loss through the nozzles will be approximately $\frac{1}{2} \cdot \rho \cdot U^2$ regardless of the fluid (assuming incompressible fluids).

Hence, for the same pressure drop in both fluids, $(\frac{1}{2} \cdot \rho \cdot U^2)_w = (\frac{1}{2} \cdot \rho \cdot U^2)_a$ where w=water and a=air.

Hence $U_a/U_w \approx (1000/1.2)^{1/2} \approx 29$ [$U$=velocity]

Hence $V_a/V_w \approx (1000/1.2)^{1/2} \approx 29$ [$V$=volumetric flow rate]

The nozzles are designed for a supply of 285 l/min of water with a pressure drop of 0.5 bar. This implies 202 l/min for water with a pressure drop of 0.25 bar, and therefore about 5860 l/min air for a pressure drop of 0.25 bar 5860 in≈5.86 m³/min≈200 ft³/min @0.25 bar Whilst this estimate will allow for planning, each system will be fully simulated on software to understand what the expected air pressure at each nozzle will be for a fully compliant system.

Figure 15:
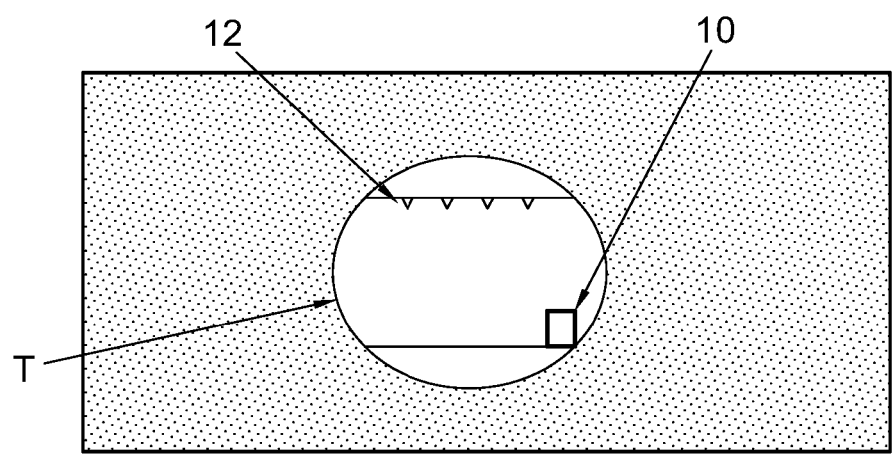
FIG. 15 shows a tunnel including the apparatus of FIG. 1.

FIG. 15 shows a tunnel T comprising the apparatus 10.

It will be recognised that the apparatus described above is merely exemplary and that various modifications may be made without departing from the scope of the claimed invention.

Figure 16:
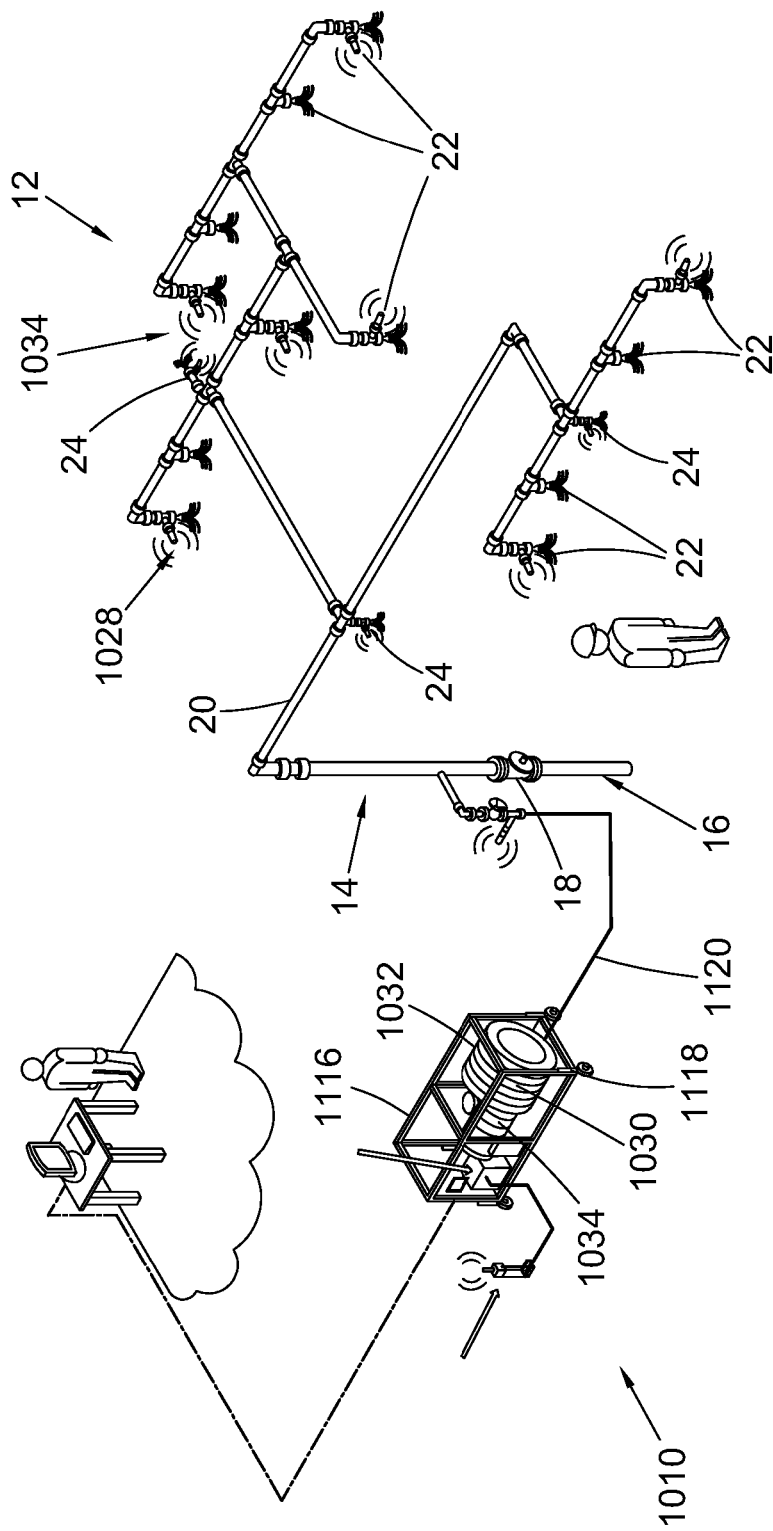
FIG. 16 shows an alternative apparatus for testing a water deluge system

For example, FIG. 16 shows an alternative apparatus 1010. The apparatus 1010 is similar to the apparatus 10, with the difference that the compressor 30 and air receiver 40 have been replaced with a blower 1030.

The blower 1030 is disposed on a movable skid 1116 having wheels 1118 and is coupled to deluge valve 18 via a fluid conduit 1120. In the illustrated apparatus 1010, the blower 1030 comprises a pump 1032 in the form of multi-stage centrifugal pump and a motor 1034.

In use, the blower 1030 is configured to intake air at atmospheric pressure and provide an exhaust air supply to the water deluge system 12 at higher air pressure than atmospheric pressure.

Beneficially, the blower 1030 is capable of directing a flow of air at high flow and relatively low gauge pressure, i.e., higher pressure than atmospheric pressure but lower than high pressure air systems, into and through the water deluge system 12, and thus obviates or at least reduces the requirement for a gas source such as an accumulator, an air receiver such as a bank of compressed air cylinders and/or a pressure regulator skid.

The blower 1030 occupies a relatively small footprint in comparison to conventional test apparatus. This is particularly beneficial in offshore installations, such as platform, rigs and the like, due to the size and weight limitations for transportation to/from the installation and/or where deck space is typically limited and which may prevent conventional test equipment from being installed on a permanent basis.

As described above, the apparatus described above is merely exemplary and that various modifications may be made without departing from the scope of the claimed invention. For example, the apparatus may alternatively comprise an air mover.

The invention claimed is:

1. A method for testing a tunnel fire suppression system in the form of a water deluge system having a wet side and a dry side separated by a valve, the method comprising:
   providing a supply of pressurized air through the water deluge system using a compressor coupled to the water deluge system;
   providing a sensor arrangement,
   wherein the sensor arrangement comprises:
      a sensor configured to measure a pressure of air at an inlet valve to the water deluge system and output one or more output signals indicative of a pressure of the air at the inlet valve; and
      a plurality of sensors configured to measure the pressure of air at each of a selected subset of outlets or all of the outlets of the water deluge system and output one or more output signals indicative of the pressure of the air at each of the subset of outlets or all of the outlets;
   providing a nozzle arrangement,
   wherein the nozzle arrangement comprises a plurality of nozzles, each nozzle disposed in or coupled to e of the subset of outlets or all of the outlets of the water deluge system,
   wherein the nozzle arrangement is coupled to or operatively associated with the sensor arrangement;
   measuring the pressure of the air at the inlet valve of the water deluge system and outputting the one or more output signals indicative of the pressure of the air at the inlet valve;
   measuring the pressure of the air at each of the subset of outlets or all of outlets of the water deluge system and outputting the one or more output signals indicative of the pressure of the air at each of the subset of outlets or all of the outlets;
   conveying the output signal signals indicative of the pressure of the air at the inlet valve and indicative of the pressure of the air at each of the subset of outlets or all of the outlets to a processing system configured to compare the one or more output signals indicative of the pressure of the air at the inlet valve with the one or more output signals indicative of the pressure of the air at each of the subset of outlets or all of the outlets and determine from the one output signals a flow rate of an air supply at each of the subset of outlets or all of the outlets.

2. The method of claim 1, comprising determining a condition of the water deluge system from the one or more output signals from each of the subset of outlets or all of the outlets.

3. The method of claim 1, further comprising the replacing a pre-existing nozzle arrangement with the nozzle arrangement.

4. The method of claim 1, comprising measuring the flow rate of the air the inlet valve of the water deluge system and outputting an output signal indicative of the flow rate of air at the inlet valve.

5. The method of claim 4, comprising comparing the output signal indicative of the flow rate of air at the inlet valve with the or more output signal(s) from each of the subset of outlets or all of the outlets.

6. The method of claim 5, comprising determining a condition of the water deluge system from the compared output signals from the inlet valve and each of the subset of outlets or all of the outlets.

7. The method of claim 6, comprising determining a condition of the water deluge system by comparing the determined flow rate of the air at each of the subset of outlets or all of the outlets to a reference signal.

8. The method of claim 1, comprising comparing the flow rate of the air supply at each of the subset of outlets or all of the outlets with a previous wet test.

9. The method of claim 1, comprising subsequently performing a wet test.

10. The method of claim 9, comprising comparing the flow rate of the air supply at ea et outlets or all of the outlets with the subsequent wet test.

11. The method of claim 1, comprising performing a sequence test to verify flow directed to each of the plurality of nozzles.

12. A method, comprising:
  performing the method of claim 1 at a first time period to provide a first test data set indicative of a condition of the water deluge system;
  performing the method of claim 1 or a wet test at a second time period to provide a second test data set indicative of the condition of the water deluge system; and
  outputting the first data set and the second data set.

13. An apparatus for testing a tunnel fire suppression system in the form of a water deluge system having a wet side and a dry side separated by a valve, the apparatus comprising:
  a compressor configured for coupling to an inlet valve of the water deluge system, the compressor configured to provide a supply of pressurized air through the water deluge system from the inlet valve to a plurality of outlets of the water deluge system;
  a sensor arrangement, wherein the sensor arrangement comprises
    a sensor configured to measure a pressure of the air at the inlet valve to the water deluge system and output one or more output signals indicative of the pressure of the air at the inlet valve; and
    a plurality of sensors configured to measure a pressure of the air at each of a selected subset of outlets or all of the outlets of the water deluge system and output one or more output signals indicative of the pressure of the air at each of the subset of outlets or all of the outlets;
  a nozzle arrangement,
  wherein the nozzle arrangement comprises a plurality of nozzles, each nozzle disposed in or coupled to a respective one of the subset of outlets or all of the outlets of the water deluge system,
  wherein the nozzle arrangement is coupled to or operatively associated with the plurality of sensors of the sensor arrangement configured to measure the pressure of air at each of the subset of outlets or all of the outlets of the water deluge system; and
  a communication arrangement configured to convey the one or more output signals indicative of the pressure of the air at the inlet valve and indicative of the pressure of the air at each of the subset of outlets or all of the outlets from the sensor arrangement to a processing system configured to compare the one or more outlet signals indicative of the air at the inlet valve and indicative of the pressure of the air at each of the subset of outlets or all of the outlets and determine from the output signals a flow rate of an air supply at each of the subset is or all of the outlets.

14. The apparatus of claim 13, wherein at least one nozzle of the plurality of nozzles of the nozzle arrangement comprises a metering nozzle.

15. The apparatus of claim 13, wherein at least one nozzle of the plurality of the nozzles comprises a flow tube portion.

16. The apparatus of claim 15, wherein the flow tube portion is tubular in construction.

17. The apparatus of claim 15, wherein a length of the flow tube portion is greater than a length of a nozzle portion of the at least one nozzle.

18. The apparatus of claim 15, wherein the least one nozzle is configured to receive the sensor that is associated with the respective outlet of the subset of outlets or all of the outlets.

19. The apparatus of claim 15, wherein the at least one nozzle comprises a radially extending tubular boss portion for receiving the sensor that is associated with the respective outlet of the subset of outlets or all of the outlets, the boss portion formed or coupled to the flow tube portion.

20. The apparatus of claim 13, wherein the sensor arrangement comprises a sensor configured to measure the flow rate of the air at the inlet valve, and output one or more output signals indicative of the flow rate of the air at the inlet valve.

21. A water deluge system comprising the apparatus of claim 13.

22. A tunnel comprising the water deluge system of claim 21.

* * * * *